United States Patent
Kagawa

[11] Patent Number: 5,835,870
[45] Date of Patent: Nov. 10, 1998

[54] AUTOMATIC STEERING SYSTEM

[75] Inventor: Kazunori Kagawa, Odawara, Japan

[73] Assignee: Toyota Jidosha Kabushiki Kaisha, Japan

[21] Appl. No.: 726,605

[22] Filed: Oct. 7, 1996

[30] Foreign Application Priority Data

Feb. 5, 1996 [JP] Japan .................................... 8-019173

[51] Int. Cl.$^6$ ................................................ G06F 165/00
[52] U.S. Cl. ............................... 701/23; 701/41; 180/421
[58] Field of Search ................................. 701/23, 24, 41, 701/50; 180/168, 169, 401, 419, 421, 422; 280/99

[56] References Cited

U.S. PATENT DOCUMENTS

| | | | |
|---|---|---|---|
| 4,219,093 | 8/1980 | Lang | 180/401 |
| 5,234,070 | 8/1993 | Noah et al. | 180/422 |
| 5,289,893 | 3/1994 | Yamamoto et al. | 701/41 |
| 5,375,863 | 12/1994 | Chapman | 280/99 |

FOREIGN PATENT DOCUMENTS 3-286315   12/1991   Japan .

Primary Examiner—Gary Chin
Attorney, Agent, or Firm—Finnegan, Henderson, Farabow, Garrett & Dunner, L.L.P.

[57] ABSTRACT

A system installed on a steering mode switchable vehicle, for allowing a smooth mode shift from an automatic steering mode to a manual steering mode. During the automatic steering mode, a differential motor is activated to drive a tire drive mechanism, and a lock mechanism is operated to lock a steering wheel. In order to shift from the automatic steering mode to the manual steering mode, an ultrasonic motor, disposed at the coupling portion of the steering wheel and a steering shaft, is activated so that only the steering wheel is turned to make its turning amount coincide with the actual steering angle. Only after the detection of the angle coincidence are the ultrasonic motor and the differential motor turned off and the lock mechanism released. The steering mode is then shifted to the manual steering mode.

7 Claims, 3 Drawing Sheets

5,835,870

AUTOMATIC STEERING SYSTEM

FIELD OF THE INVENTION

The present invention relates to an automatic steering system, and more particularly to mode shift control from an automatic steering mode to a manual steering mode.

DESCRIPTION OF THE PRIOR ART

There has been known an automatic steering system which is installed on a vehicle for calculating a traveling path for the vehicle and guiding the vehicle along the path.

For instance, Japanese Patent Laid-Open No. Hei 3-286315 discloses an automatic steering system having a steering mode change switch which enables a driver to switch from an automatic steering mode to a manual steering mode in which a normal steering wheel operation is performed, or vice versa, as he or she desires. In the automatic steering mode, the steering wheel becomes disconnected from a tire drive mechanism, which is then individually driven by an actuator. If the driver operates the steering wheel during the automatic steering mode, this steering amount of the wheel is also taken into consideration to determine a total desired steering angle.

However, such disconnection between the steering wheel and the tire drive mechanism during the automatic steering mode may cause the following problem. That is, after the steering mode is returned to the manual steering mode from the automatic steering mode, it may be possible that the turning angle of the steering wheel does not correspond to the actual steering angle, which does not feel natural to the driver. Here, it would seem effective to lock the steering wheel during the automatic steering mode. However, even if the steering wheel is locked, the tire drive mechanism turns independently of the steering wheel during the automatic steering mode, and therefore this cannot solve the foregoing problem.

SUMMARY OF THE INVENTION

The present invention is intended to overcome the foregoing problem, and aims to provide an automatic steering system which allows a smooth mode shift from an automatic steering mode to a manual steering mode by making a turning angle of a steering wheel coincide with an actual steering angle, i.e. an turning angle of a tire drive mechanism.

In order to accomplish the foregoing object of the invention, there is provided an automatic steering system comprising: switch means for switching from an automatic steering mode to a manual steering mode or vice versa; an automatic steering mechanism for turning a steering shaft independently of a steering wheel during the automatic steering mode; drive means for turning the steering wheel in synchronism with a turn created by the automatic steering mechanism when the switch means is operated to switch from the automatic steering mode to the manual steering mode; and mode control means for establishing a mode shift from the automatic steering mode to the manual steering mode if a turning angle of the steering shaft coincides with a turning angle of the steering wheel.

When the switch means is operated to switch the steering mode from the automatic steering mode to the manual steering mode, the manual mode does not start immediately, but starts only after the turning angle of the steering wheel is made to coincide with the actual steering angle. In this way, the driver does not experience any feeling of discomfort at the time of the mode shift, and can start the manual steering operation smoothly. Preferably, the driver is informed in advance that the steering wheel will be turned by the drive means.

Each of the automatic steering mechanism and the drive means includes a motor having a characteristic of preserving its output angle in an unactuated state and serves as a connector for turning the steering wheel and the steering shaft during the manual steering mode. For example, a differential motor is used as the automatic steering mechanism and an ultrasonic motor is used as the drive means.

BRIEF DESCRIPTION OF THE DRAWINGS

The present invention will become more apparent from the following detailed description of the presently preferred embodiment when taken in conjunction with the accompanying drawings.

DESCRIPTION OF PREFERRED EMBODIMENTS

Figure 1:
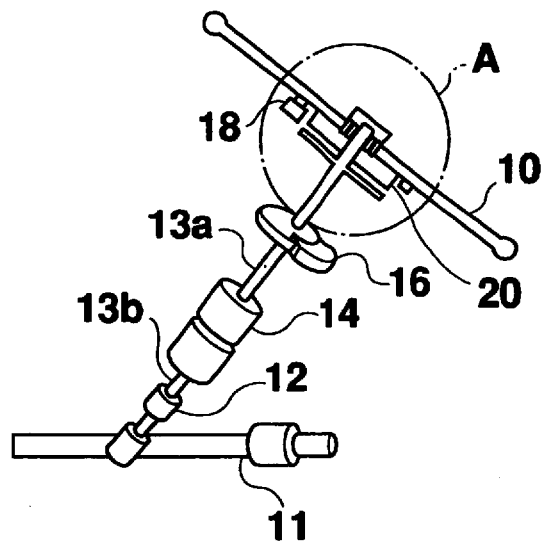
FIG. 1 is a diagram for explaining the configuration of a steering system according to an embodiment of the present invention.

FIG. 1 shows the overall configuration of a steering portion according to one embodiment of the present invention. As shown in FIG. 1, a steering wheel 10 is connected to a steering shaft whose lower end is engaged with a tire drive mechanism 11 by means of a pinion. A pinion angle sensor 12 is disposed near the pinion for detecting a turning angle of the pinion. The steering shaft is provided with a differential motor 14 which divides the steering shaft into an upper steering shaft 13a and a lower steering shaft 13b.

The differential motor 14 has a characteristic of preserving its output angle in an unactuated state. Specifically, the differential motor 14 drives and rotates its output axis when a drive current is applied thereto, whereas it preserves its output angle when an external rotating torque around the axis is applied with no drive current being applied thereto. The output axis of the differential motor is connected to the lower steering shaft 13b. Therefore, when the differential motor 14 is driven, the lower steering shaft 13b is turned independently of the upper steering shaft 13a so that the tire drive mechanism 14 is driven to perform steering. On the other hand, when it is not driven, the differential motor 14 serves as a kind of connector for preserving its output angle and turns the upper and lower steering shafts 13a and 13b as an integrated member.

Further, the upper steering shaft 13a has a lock mechanism 16 which is operated to restrain turning of the upper steering shaft 13a. The steering shaft 13a is connected via bearings and an ultrasonic motor to the steering wheel 10.

Figure 2:
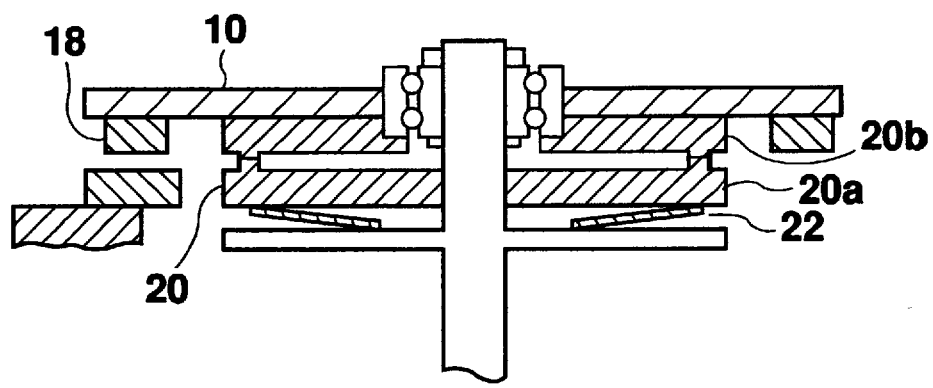
FIG. 2 is a enlarged cross section of the portion A in FIG. 1.

FIG. 2 is an enlarged cross section of a connecting portion of the steering wheel 10 and the upper steering shaft 13a as indicated by A in FIG. 1. The steering wheel 10 and the upper steering shaft 13a are engaged with each other by insertion via the bearings. A ultrasonic motor 20 is further provided, whose stator 20a is disposed at an upper end of the upper steering shaft 13a via a pressure contact disc spring 22 and whose rotor 20b is disposed at the steering wheel 10. Therefore, when the ultrasonic motor 20 is driven, the steering wheel 10 turns about the upper steering shaft 13a.

The ultrasonic motor 20 also has a characteristic of preserving its output angle in an unactuated state, as with the differential motor 14. Therefore, when it is not driven, the ultrasonic motor 20 serves as a connector for the steering wheel 10 and the upper steering shaft 13a so that the steering wheel 10 and the upper steering shaft 13a are turned as an integrated part. The steering wheel 10 has a sensor 18 for detecting its turning angle.

As described, the steering system of the embodiment is provided with the ultrasonic motor 20 for individually turning the steering wheel 10, the differential motor 14 for individually turning the lower steering shaft 13b, and the lock mechanism 16 for locking the upper steering shaft 13a. In the present invention, each of these elements is controlled to be actuated or turned off appropriately, so that the automatic and manual steering operation will be smoothly performed.

Figure 3:
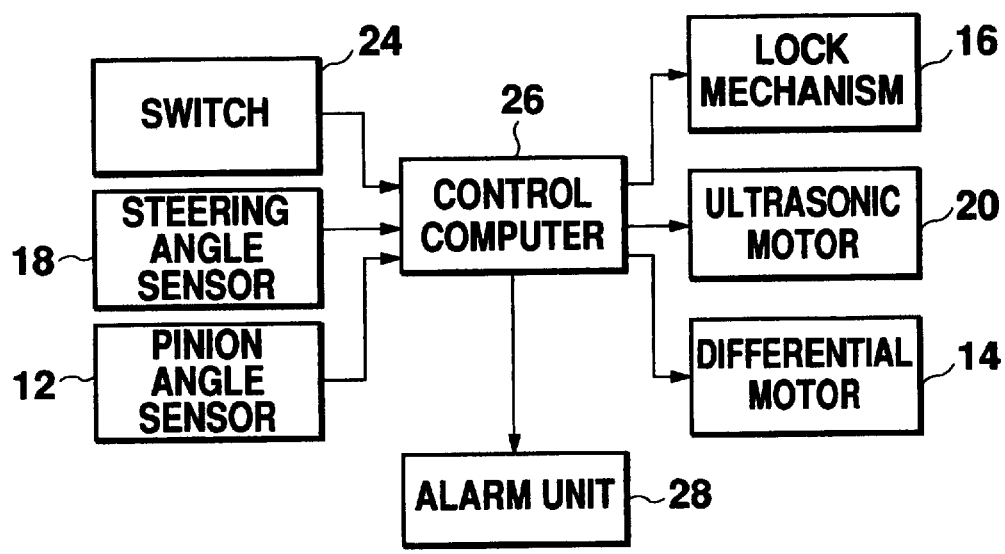
FIG. 3 is a block diagram of the configuration of an automatic steering system according to the embodiment of the present invention.

FIG. 3 shows a configuration of the system according to the embodiment. A switch 24 is disposed near a driver's seat for switching the steering modes. A mode signal from the switch 24 is supplied to the control computer 26.

When being set to the automatic steering mode, the control computer 26 actuates the lock mechanism 16 to lock the upper steering shaft 13a and fix the steering wheel 10. At the same time, the differential motor 14 is actuated to turn the lower steering shaft 13b so that the tire drive mechanism 11 is driven to perform automatic steering. The control computer 26 determines a route along which a vehicle runs on the basis of information from a travelling direction monitoring sensor (such as a CCD camera or a radar), which is not shown, and drives the differential motor 14 so as to guide the vehicle along the route. During the automatic steering mode, the ultrasonic motor 20 is not operated.

On the other hand, during the manual steering mode, the control computer 26 releases the lock mechanism to allow turning of the upper steering shaft 13a and turns the differential motor 14 off. Then, the differential motor 14 serves as a connector for the upper and lower steering shafts 13a and 13b which will be turned as an integrated member. Therefore, as long as the ultrasonic motor 20 is not operated, the driver can perform desired steering by the operation of the steering wheel 10.

However, since the lower steering shaft 13b turns independently of the steering wheel 10 during the automatic steering mode as described above, when the mode is switched to the manual steering mode, a turning angle created by the steering wheel 10 does not coincide with a turning angle of the lower steering shaft 13b, i.e., an actual steering angle. Therefore, if the manual steering mode starts immediately after the switching action, such an angle difference will adversely affect the operation in the manual steering mode and make the driver feel uncomfortable.

For this reason, in this embodiment, when the switch 24 is operated to switch from the automatic steering mode to the manual steering mode, the control computer 26 actuates the ultrasonic motor 20 so that the steering wheel 10 will be turned to establish synchronism with the actual steering angle. Only when this synchronism is established, i.e. when the turning angle of the steering angle corresponds to the actual steering angle, is the lock mechanism 16 released and the differential motor 14 is turned off for starting the manual steering mode. After such a process, the driver can smoothly perform the manual steering without feeling any discomfort.

In order to establish the synchronism, the steering wheel 10 may sometimes be turned through a considerably large turning angle. However, if the steering wheel turns through a considerable angle as the driver operates the steering wheel consciously or unconsciously, the driver may be surprised. In this embodiment, the pinion angle sensor 12 detects a pinion angle which is a turning angle of the lower steering shaft 13b, i.e. the actual steering angle, while the steering sensor 18 detects the turning angle of the steering wheel 10. Both of the detection results are supplied to the control computer 26 and compared. If the angle difference is determined to be greater than the predetermined value, i.e. if the difference is large, the control computer 26 informs the driver of this by means of an alarm unit. Thus, the driver can know in advance that the steering wheel 10 will be turned and the driver can be well prepared for such a big turn.

Figure 4:
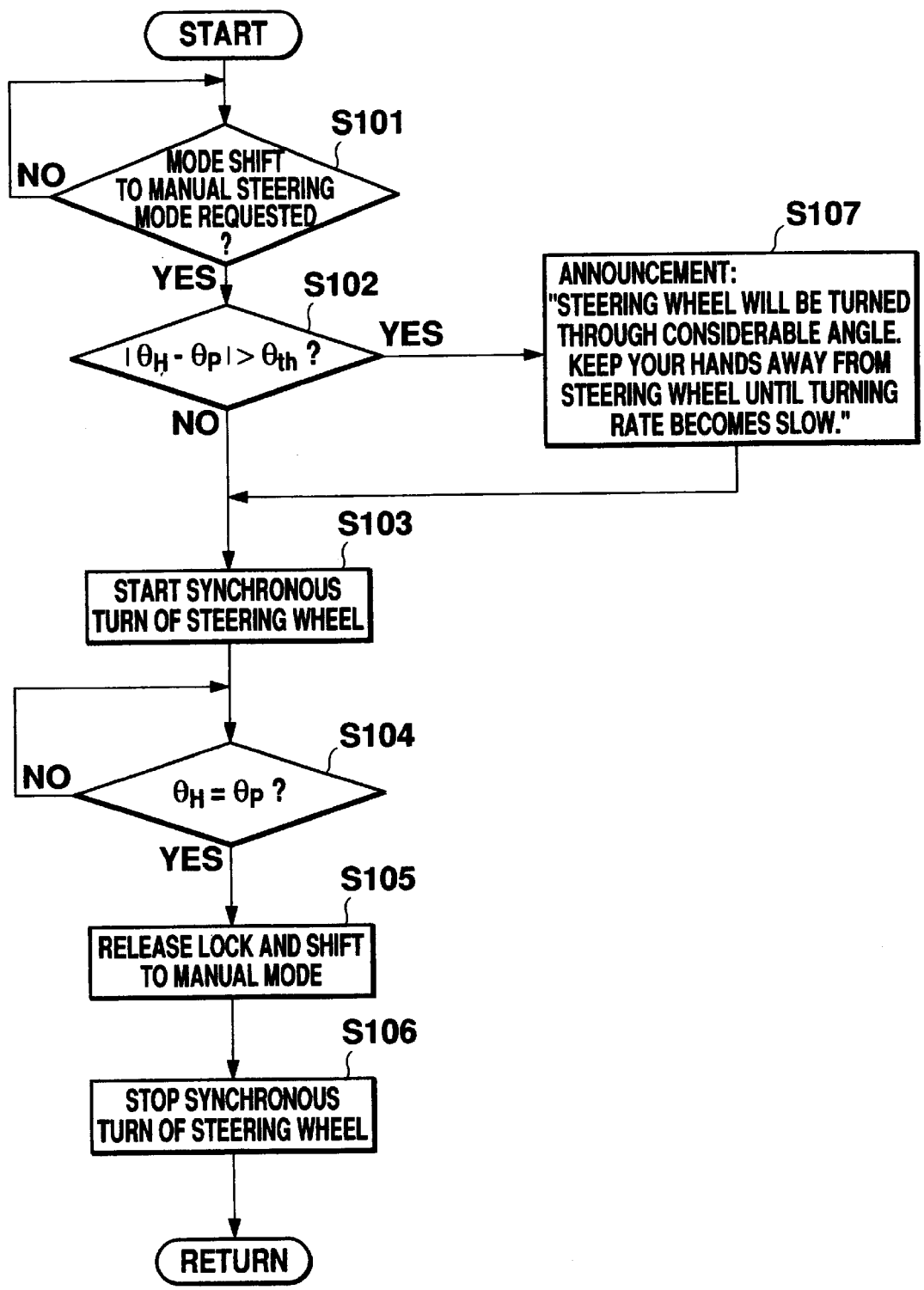
FIG. 4 is a flowchart showing an operation sequence of the system of FIG. 3.

FIG. 4 shows an operation sequence at the time of the mode shift from the automatic steering mode to the manual steering mode. First of all, the control computer 26 determines, from a signal from the switch 24, whether or not a mode shift to the manual steering mode is requested (step S101). If the mode shift to the manual steering mode is requested, it is determined from detection signals from the steering angle sensor 18 and from the pinion angle sensor 12 whether or not the difference between the steering angle $\theta H$ and the pinion angle $\theta P$ is greater than the predetermined value $\theta th$ (e.g. 30 degree) (step S102). If the difference exceeds the predetermined value, the steering wheel must be turned through a considerable angle, and this is informed to the driver by the alarm unit 28 (step S107). A preferable message to be informed may be, for example, "The steering wheel will be turned through a considerable angle. Keep your hands away from the steering wheel until the turning rate becomes slow." On the other hand, if the angle difference is not large, i.e. if it is equal to or smaller than the predetermined value, such a small turn is considered to have only a slight effect on the driver. Therefore, the steering wheel will be immediately turned so as to make the turning angle of the steering wheel coincide with the actual steering angle (step S103). This synchronous turn is achieved by driving the ultrasonic motor 20 so as to make the turning angle of the steering wheel 10 coincide with the turning angle of the differential motor 14. More specifically, a signal having the same phase as that of a drive signal for driving the differential motor 14 (a drive signal for performing automatic steering) is supplied to the ultrasonic motor 20 and it is then determined whether or not $\theta H$ corresponds to $\theta P$. If the two turning angles coincide (step S104), the control computer 26 releases the lock mechanism 16 to allow the upper steering shaft 13a to turn (step S105). At the same time, the control computer 26 turns off the ultrasonic motor 20 and the differential motor 14 to end the synchronous turn. The steering wheel 10 is then operatively connected to the upper steering shaft 13a which in turn is operatively connected to the lower steering shaft 13b, and thus steering is shifted to the manual steering mode (step S106).

In this embodiment, the driver is informed of the turn of the steering wheel only if the difference between the steering angle and the pinion angle exceeds the predetermined value. However, it should be understood that the system may inform the driver of the turn of the steering wheel every time the ultrasonic motor is driven, even if the angle difference is below the predetermined value.

Further, the drive means for turning the steering wheel is not limited to the ultrasonic motor which has been described. Any motor having a characteristic of preserving its output angle in an unactuated state, that is, any motor which turns about integrated input and output axes when an external turning torque is applied, may be similarly used.

In the foregoing embodiment, when the turning angle of the steering wheel and the actual steering angle are synchronized, the lock mechanism 16 is released and the ultrasonic motor 20 and the differential motor 14 are also turned off. However, it is also effective to continue the automatic steering operation while maintaining the synchronism for a predetermined time period after establishment of the synchronism. It is expected that the driver may feel somewhat nervous during a mode shift. Therefore, if the steering wheel turns in synchronism with the actual steering angle for a predetermined period after the mode shift, the driver can hold the steering wheel lightly during that time to learn and get accustomed to the steering conditions under the present travelling circumstances.

In this manner, the driver can shift to the manual steering mode more smoothly. In this case, if the driver is not sufficiently accustomed to the present travelling conditions, it is conceivable that a turning torque created by the driver's operation is applied to the steering wheel as a disturbance torque. Therefore, it is preferable to continuously monitor the disturbance torque and to permit a mode shift to the manual steering mode only after the disturbance torque becomes small enough to determine that the driver has become sufficiently familiar with the present traveling conditions.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. An automatic steering system for a vehicle comprising:
   (a) switch means for switching from an automatic steering mode to a manual steering mode or vice versa;
   (b) an automatic steering mechanism for turning a steering shaft independently of a steering wheel during the automatic steering mode;
   (c) drive means for turning the steering wheel in synchronism with a turn created by the automatic steering mechanism when the switch means is operated to switch from the automatic steering mode to the manual steering mode; and
   (d) mode control means for establishing a mode shift from the automatic steering mode to the manual steering mode when a turning angle of the steering shaft coincides with a turning angle of the steering wheel.

2. The automatic steering system according to claim 1, further comprising:
   (e) report means for reporting to a driver that the steering wheel will be turned by the drive means.

3. The automatic steering system according to claim 1, wherein both the automatic steering mechanism and the drive means include a motor having a characteristic of preserving its output angle in an unactuated state, and both the automatic steering mechanism and the drive means serve as a connector for turning the steering wheel and the steering shaft.

4. The automatic steering system according to claim 1, wherein the automatic steering mechanism includes a differential motor.

5. The automatic steering system according to claim 1, wherein the drive means includes an ultrasonic motor.

6. The automatic steering system according to claim 1 further comprising:
   (e) a lock mechanism for inhibiting the turning of the steering wheel during the automatic steering mode and for permitting the turning of the steering wheel during the manual steering mode.

7. An automatic steering system for a vehicle comprising:
   (a) a first motor for driving a steering mechanism independently of a steering wheel to perform automatic steering;
   (b) a second motor for turning the steering wheel independently of the steering mechanism; and
   (c) a processor for driving the second motor in synchronism with the turning of the first motor to make a turning angle of the steering wheel coincide with an actual steering angle so as to shift from an automatic steering mode to a manual steering mode.

* * * * *